United States Patent [11] 3,621,027

[72] Inventors Karl Schoen
 Kew Gardens;
 Michael Finizio, Brooklyn, both of N.Y.
[21] Appl. No. 714,067
[22] Filed Mar. 18, 1968
[45] Patented Nov. 16, 1971
[73] Assignee Endo Laboratories Inc.
 Garden City, N.Y.

[54] 1-AMINOALKYL-2,6-DIARYL 4,5,6,7 TETRAHYDRO-4-OXINDALES
 11 Claims, No Drawings
[52] U.S. Cl. .................................................. 260/293.61,
 260/240 D, 260/290, 260/247.1, 260/243 B,
 260/247.5 B, 260/250 A, 260/268 BC, 260/288 R,
 260/294.8 C, 260/295 B, 260/296 B, 260/309,
 260/310 R, 260/315, 260/326.12 R, 260/326.13
 R, 260/326.14 R, 260/326.15
[51] Int. Cl. ............................................... C07d 27/56
[50] Field of Search ........................................ 260/326.15,
 294.7 G

[56] References Cited
 UNITED STATES PATENTS
3,491,093 1/1970 Pachter et al. ................ 260/247.5

Primary Examiner—Alex Mazel
Assistant Examiner—Joseph A. Narcavage
Attorney—Ostrolenk, Faber, Gerb & Soffen ABSTRACT: The novel 1-aminoalkyl-2,6-diaryl-4,5,6,7-tetrahydroindoles of the present application are useful as analgetics and antitussives. They may be prepared by either of two routes. In the first mode of preparation, the corresponding 2,6-diaryl-4,5,6,7-tetrahydro-4-oxoindole is reacted with aminoalkylating agent. In the second mode, a 2-aroylmethyl-6-aryl-1,3-cyclohexanedione is reacted with an appropriate diamine. In order to produce the compounds of this invention which are devoid of an oxo substituent at the 4 position, the 4-oxoindole produced as above is treated with an appropriate reducing agent.

1-AMINOALKYL-2,6-DIARYL 4,5,6,7 TETRAHYDRO-4-OXINDALES

FIELD OF THE INVENTION

The invention relates to novel analgetic and antitussive compounds.

DESCRIPTION OF THE PRIOR ART

In applicant's copending application Ser. No. 612,795, filed Jan. 31, 1967, now U.S. Pat. No. 3,503,990, issued Mar. 31, 1970, there are disclosed related compounds, which, however, have marked structural differences from those disclosed herein and, are also prepared by different methods, said application discloses 1-aminoalkyl-6-aryl-4,5,6,7-tetrahydro-4-oxoindole-2-carbonyl compounds.

SUMMARY OF THE INVENTION

The new 1-aminoalkyl-2,6-diaryl-4,5,6,7-tetrahydro-indoles of the present invention may be chemically represented by structural formula A.

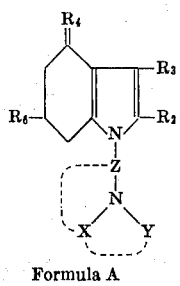

Formula A

Wherein:

$R_3$ is selected from the group consisting of hydrogen, lower alkyl, lower alkenyl, cycloalkyl, homoaryl, aralkyl, substituted homoaryl, substituted aralkyl, heteroaryl and substituted heteroaryl:

$R_2$ and $R_6$ are selected from the group consisting of homoaryl, heteroaryl, substituted homoaryl, substituted heteroaryl, cycloalkenyl and cycloalkyl.

$R_4$ is selected from the group consisting of one oxygen or two hydrogen atoms.

Z is a straight or branched hydrocarbon chain of two to five carbon atoms.

X and Y are hydrogen, alkyl, substituted alkyl, or unsaturated alkyl, including substituted and unsaturated alkyl. When taken together with the nitrogen atom to which they are attached, the group

may form a saturated heterocyclic ring of not more than eight members; such ring, if desired, may be variously substituted.

It is also within the scope of the invention that the groups Z and X may be connected so that the moiety

forms a similar heterocyclic or substituted heterocyclic ring moiety.

The compounds disclosed herein may be readily prepared by one of two basic routes. In the first route, as illustrated diagrammatically hereinbelow, a 5-substituted cyclohexane-1,3-dione (I) is reacted with an alpha-oximinocarbonyl compound (II) in the presence of zinc and acetic acid to yield the corresponding 4-oxo-indole (III) which is then treated with a base and an aminoalkylating agent V to yield the desired 1-aminoalkyl-4,5,6,7 tetrahydro-4-oxoindole (A).

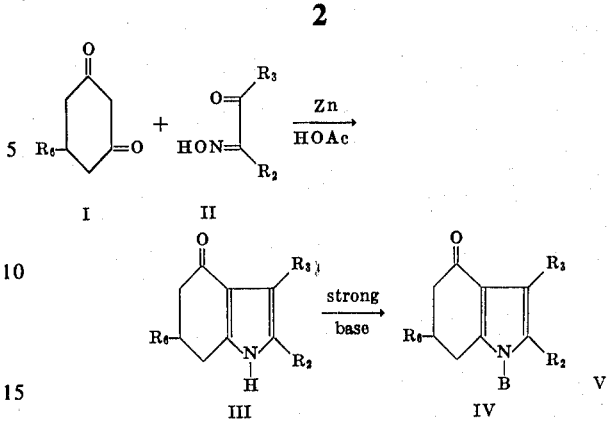

In the alternative route, a 6-aryl-1,3-cyclo-hexanedione (VI) is condensed with a halomethylaryl ketone (VII) to yield the corresponding 2-aroylmethyl-6-aryl-1,3-cyclohexanedione (VIII). This latter compound is then reacted with an appropriate diamine (IX) to form the final product of formula A.

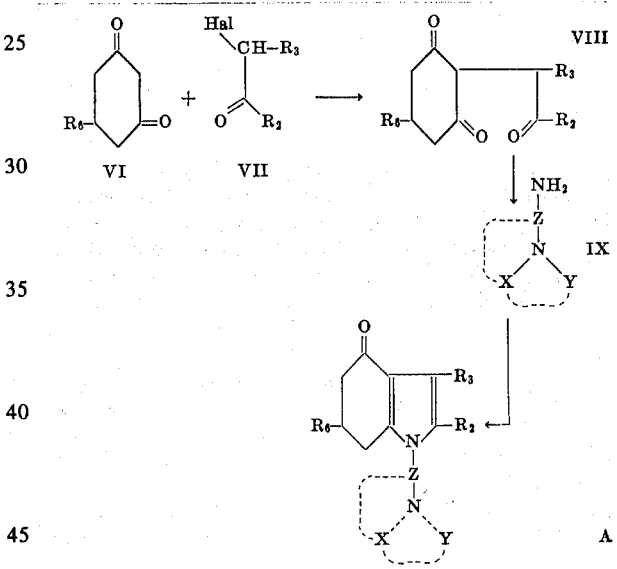

Where it is desired to produce the 4,5,6,7-tetrahydroindoles of the present invention, that is to say, those compounds devoid of an oxo group at the 4-position of the tetrahydroindole nucleus, the corresponding 4-oxo compound is reduced with a suitable reducing agent. The aminoalkyl chain may be added either before or after reduction.

The compounds of the present invention are useful as antitussives and analgetics; while all of the compounds of the present invention are active in this respect, it is to be understood that variations in activity will occur from compound to compound. It is to be noted, however, that certain of the compounds within the scope of the present invention have shown analgetic potency of between 20 to about 40 times that of codeine.

The compounds may be administered orally or parentally. However, the oral route in the form of tablets is preferred. The optimum dosage is a matter to be left to the discretion of the individual treating physician since it depends on the exact compound used and the severity of the symptoms being treated. However, the oral dose levels of the preferred compounds will lie in the range of 1 to 1,000 milligrams per day.

PREFERRED EMBODIMENTS OF THE INVENTION

Within the scope of the compounds embraced by general formula A, shown hereinabove, it will be noted that certain substituent groups are preferred. Among the preferred groups the following may be mentioned.

$R_3$ is hydrogen, or lower alkyl, such as methyl, ethyl, propyl, butyl or pentyl; lower alkenyl, such as vinyl, allyl, butenyl, or hexenyl; homoaryl, such as phenyl, napthyl, or anthryl; aralkyl, suitably benzyl or phenethyl; substituted homoaryl, such as haloaryl, for example chlorophenyl, dichlorophenyl, p-fluorophenyl; or alkyl phenyl, such as tolyl; or alkoxyphenyl, such as methoxyphenyl, butoxyphenyl or hexoxphenyl; substituted aralkyl, such as chlorobenzyl, p-fluorobenzyl, or methoxyphenethyl; heteroaryl, such as thienyl, furyl, pyrrolyl, imidazolyl, pyrazolyl, pyridyl, pyridazinyl, quinolinyl, carbazolyl, and the like, as well as substituted heteroaryl, wherein the substituents may be halo, such as bromo, fluoro, or chloro; alkyl, such as methyl, ethyl, butyl, and heptyl; and alkoxy, such as methoxy, propoxy, or butoxy.

$R_2$ and $R_6$ may be homoaryl, such as phenyl or naphthyl; substituted homoaryl such as halo phenyl, for example, dichlorophenyl or parafluorophenyl; alkylphenyl, such as tolyl; or alkoxyphenyl, such as methoxyphenyl, butoxyphenyl or hexoxyphenyl heteroaryl, such as thienyl, furyl, pyrrolyl, imidazolyl, pyrazolyl, pyridyl, pyridazinyl, quinolinyl, carbazolyl, and the like, as well as substituted heteroaryl, wherein the substituents may be halo, such as bromo, fluoro or chloro; alkyl, such as methyl, ethyl, butyl, and heptyl; and alkoxy, such as methoxy, propoxy or butoxy.

$R_2$ and $R_6$ may also be cycloalkyl, such as cyclopropyl, cyclopentyl, cyclohexyl, and cycloheptyl; or cycloalkenyl, such as cyclopentenyl, cyclopentadienyl, cyclohexenyl, cyclohexadienyl, cycloheptenyl and the like.

X and Y may be hydrogen or substituted or unsubstituted lower alkyl, lower alkenyl or cyclo lower alkyl; where alkyl may be methyl, ethyl, butyl, pentyl, or hexyl; alkenyl may be vinyl, allyl, butenyl, butadienyl, pentenyl, or hexenyl; cycloalkyl may be cyclopropyl, cyclopentyl, cyclohexyl, or cycloheptyl; and the substituent group may be hydroxy, lower alkoxy, carbamoyloxy, phenyl and the like.

When taken together with the nitrogen atom to which they are attached, the group

may form a saturated heterocyclic ring of not more than eight members such as piperidino, (lower alkyl)piperidino, di(lower alkyl)piperidino, (lower alkoxy)piperidino, hydroxypiperidino, (lower alkanoyl)piperidino, pyrrolidinyl, (lower alkyl)pyrrolidinyl, (lower alkoxy)pyrrolidinyl, hydroxypyrrolidinyl, morpholino, (lower alkyl)morpholino, thiomorpholino, (lower alkyl)thiomorpholino, di(lower alkyl)thiomorpholino, (lower alkoxy)thiomorpholino, piperazinyl, (lower alkyl)piperazinyl, di(lower alkyl)piperazinyl, (lower alkoxy)piperazinyl, phenylpiperazinyl, chlorophenylpiperazinyl, tolylpiperazinyl, methoxyphenylpiperazinyl, hydroxyalkylpiperazinyl, lower alkanoyloxy-lower alkylpiperazinyl carbamoyloxy-lower alkylpiperazinyl hexamethylenimino and heptamethylenimino. The terms "lower alkanoyl," "lower alkyl" and "lower alkoxy" refer to both straight branched chain and cyclic radicals of no more than six carbon atoms.

Similarly, when X and Z are connected to each other, the group

will signify a saturated heterocyclic ring of not more than eight members and only one heteroatom (nitrogen) such as hexamethylenimino, heptamethylenimino, piperidyl, (lower alkyl)piperidyl, di(lower alkyl)piperidyl, (lower alkoxy)piperidyl, hydroxypiperidyl, (lower alkanoyloxy) piperidyl, pyrrolidyl, (lower alkyl)pyrrolidyl, (lower alkoxy)pyrrolidyl, hydroxypyrrolidyl, morpholinyl, (lower alkyl)morpholinyl, thiomorpholinyl, (lower alkyl)thiomorpholinyl, di(lower alkyl)thiomorpholinyl, (lower alkoxy)thiomorpholinyl piperazinyl, (lower alkyl)piperazinyl, di(lower alkyl)piperazinyl, (lower alkoxy) piperazinyl, phenylpiperazinyl, chlorophenylpiperazinyl, tolylpiperazinyl, methoxyphenylpiperazinyl, hydroxyalkylpiperazinyl, lower alkanoyloxy-lower alkylpiperazinyl and carbamoyloxy-lower alkylpiperazinyl. The terms "lower alkanoyl," "lower alkyl" and "lower alkoxy" refer to both straight and branched chain and cyclic radicals of no more than six carbon atoms.

In the first process of preparing the compounds of Formula A, the requisite 5-substituted 1,3-cyclohexanedione (I) and an equimolar amount of the oximinocarbonyl compound (II) are dissolved in glacial acetic acid, warmed to from about 40° to about 70° C., and a small amount of water added. Zinc dust is then added, an excess of from about 3 to about 7 atoms of zinc per mole of cyclohexanedione (I) being preferred. The reaction is spontaneously exothermic, and is completed by heating under reflux for a period of from about 20 minutes to about 1 hour. The reaction mixture is then worked up. In the preferred method the reaction mixture is poured onto ice, and the solid precipitate collected as a residue on a filter, washed with water, dried and recrystallized from acetic acid to yield the desired 4,5,6,7-tetrahydro-4-oxo-2,6-disubstituted indole (III).

Where it is desired to place an aminoalkyl group at the 1-position of this tetrahydroindole (III), the tetrahydroindole is dissolved in a strong base, and the aminoalkylating agent added. In the preferred procedure the tetrahydroindole is taken up in a nonhydroxylic organic solvent, suitably dioxane, an alkali metal, such as sodium or potassium, the latter being preferred, added and the mixture heated and stirred in an inert atmosphere, suitably a nitrogen atmosphere. Upon heating it is observed that the tetrahydroindole first dissolves and upon stirring and heating reacts with the alkali metal to form, for example, the potassium derivative (IV) which is precipitated. The alkylating agent is then added. It will be understood that any aminoalkylating agent (V) of the type

(V) may be employed where

and

are defined as above, Z is an alkyl moiety, and Q is halide or sulfate.

The aforedescribed aminoalkylating agent is used in a suitable nonhydroxylic organic solvent, such as benzene, toluene, or the like and added slowly to the aforementioned reaction mixture. This new reaction mixture is then heated under reflux, for a period of from about 1 to about 4 hours, the solvent removed by evaporation under reduced pressure and the reaction product isolated.

In the preferred isolation procedure, the residue is taken up in a dilute mineral acid, suitably dilute hydrochloric or sulfuric acid, the residue discarded, and the desired product, the product of formula A, precipitated from the acidic solution by the addition of excess base, suitably excess ammonia. The precipitated product may then be purified in the usual manner.

In the second method of preparing the compounds of the present invention, the 5-substituted-1,3-cyclohexanedione (VI) is reacted with a halomethylaryl ketone (VII). The aryl group on the aryl ketone is that group which will be the substituent at the 2-position in the final product. The methyl moiety of the ketone may be further substituted with a substituent which will then be the substituent at the 3-position of the final product. Hence, the substituents on the halomethyl aryl ketone are those designated as $R_2$ and $R_3$, respectively.

In the process, the 5-substituted-1,3-cyclohexanedione (VI)

is dissolved in a mixture of an aqueous alkanol for example, ethanol or methanol, the latter being preferred, and aqueous alkali, such as sodium hydroxide or potassium hydroxide added. The solution is then treated with the halomethylaryl ketone and stirred for from 3 to 7 hours. The mixture is then allowed to stand at ambient temperature, that is to say, between about 10° C. and about 30° C. for a period of from about 3 to about 6 days, and the liquid phase removed by evaporation under reduced pressure. The intermediate product, that is to say, the 2-(aroylmethyl)-6-aryl-1,3-cyclohexanedione (VIII) (which may, if desired, be substituted alpha to the acyclic carbonyl), is then isolated.

The 2-aroylmethyl-6-aryl-1,3-cyclohexanedione (VIII) is then reacted with the desired N-substituted aminoalkylamine. In the preferred mode of reaction, the reactants are taken up in an organic solvent suitable for the formation of azeotropic mixtures with water, for example, benzene or toluene. Solvents such as chloroform, which also form azeotropes, are not recommended due to the possibility of reaction with the amine. The water produced in the course of the reaction is removed in the usual manner, for example, by use of a Dean-Stark trap. After refluxing for a period of from about 16 to about 25 hours or for about 3 or 4 hours after no further formation of water is noted, the solvents are removed under reduced pressure and the product is isolated.

In the preferred isolation procedure the residue is taken up in a weak acid, suitably dilute aqueous acetic acid, and made alkaline by the addition of an inorganic base, aqueous ammonia being preferred. A precipitate is formed, which is allowed to solidify and which is then recrystallized from a suitable solvent, for example, from benzene, cyclohexane, or the like, to form the desired compound of formula A.

Where the group

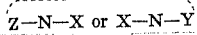

is a piperidine moiety, it has been found convenient to carry out the synthesis utilizing the corresponding pyridylamine or picolylamine, respectively, followed by reduction of the unsaturated heterocyclic ring to form the desired saturated ring. In the preferred procedure the corresponding compound of formula A wherein the group

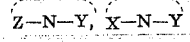

is a pyridine moiety, is dissolved in acetic acid, and hydrogenated in the presence of approximately 20 percent by weight (relative to indole) of platinum oxide. The hydrogenation is carried out at a temperature between about 50° to about 70° C. at a pressure of from about 30 to about 75 pounds per square inch, preferably at about 60° C. and 50 pounds per square inch for a period of about 6 hours. The catalyst is then removed by filtration, and the filtrate is evaporated to dryness under reduced pressure. It has been found that compounds of this class are most conveniently isolated as the hydrochloride rather than as the free base. As in the preferred procedure the residue is taken up in a suitable solvent, such as ether, gaseous hydrogen chloride passed through the ether solution, and the product is precipitated as the hydrochloride salt, which is separated by filtration, washed with ether, dried and recrystallized from a suitable solvent, for example, a lower alkanol such as isopropanol.

Also within the scope of this invention are compounds of formula A wherein the group M at the 4-position of the indole nucleus is hydrogen.

These compounds are produced in the manner set forth hereinabove, followed by a reduction step wherein the keto group at the four-position of the indole nucleus is removed. This reduction may be carried out, using a suitable reducing agent, lithium aluminum hydride or diborane being preferred. Where lithium aluminum hydride is the reducing agent a suspension thereof in tetrahydrofuran is prepared and the appropriate 4-oxoindole unsubstituted at the one-position (compound III) is added to the suspension by reflux extraction through a Soxleth extraction system. The reaction is quenched with ethyl acetate and water and worked up in the usual manner to yield the desired product.

The nitrogen atom of the indole nucleus is then aminoalkylated in the manner set forth hereinabove via the potassium derivative route.

Where it is desired to carry out the reduction step, upon a 4-oxoindole already carrying an aminoalkyl substituent at the 1-position, it is preferred to carry out the reaction using diborane in tetrahydrofuran as the reducing agent. In this procedure the oxoindole in tetrahydrofuran is added to an excess of diborane in tetrahydrofuran. It is preferred to use approximately 2 moles of diborane per mole of oxoindole and to carry out the reaction at from about −5° to about +5° C. in an inert atmosphere, suitably a nitrogen atmosphere. Upon completion of the addition the reaction mixture is stirred for between 1 and 2 hours at ambient temperatures, suitably between 15° C. and 30° C. and the mixture quenched by the addition of aqueous mineral acid. The addition of 5N hydrochloric acid is deemed especially suitable. The reaction is then worked up in the usual manner to yield the desired product.

PHARMACOLOGICAL ACTIVITY

While all of the compounds within the scope of the present invention possess a certain amount of analgetic and antitussive activity, the degree of such activity will, of course, vary between individual compounds.

Certain compounds specifically exemplified herein have been tested for analgetic activity in mice and rats and the results are summarized in Table 1 below.

TABLE 1.—$ED_{50}$ VALUES, EXPRESSED IN mg./kg., FOR WRITHING AND HOT PLATE TESTS (ORAL) IN THE MOUSE AND THE RAT

| Compound | PQ writhing test, $ED_{50}$, mg./kg. | | Hot plate test, $ED_{50}$, mg./kg. | | Mouse $LD_{50}$, mg./kg. |
|---|---|---|---|---|---|
| | Mouse | Rat | Mouse | Rat | |
| 1-dimethylaminoethyl-4,5,6,7-tetrahydro-4-oxo-2,6-diphenylindole (Ex. 1.1) | 1.3±0.2 | 2.2±0.5 | 32±9 | 8.0±2.1 | 200 |
| 1-(2-dimethylaminoethyl)-4,5,6,7-tetrahydro-3-methyl-4-oxo-2,6-diphenylindole (Ex. 4.1) | 0.70±0.16 | 2.0±0.5 | 32±8 | | 70 |
| 2-(p-chlorophenyl)-1-(2-dimethylaminoethyl)-4,5,6,7-tetrahydro-4-oxo-6-phenylindole (Ex. 3.1) | 1.5±0.3 | | | | >300 |
| 2-benzyl-1-(2-dimethylaminoethyl)-4,5,6,7-tetrahydro-3-methyl-4-oxo-6-phenylindole hydrochloride | 6.2±2 | | | | 300 |
| 6-(p-chlorophenyl)-1-(2-dimethylaminoethyl)-4,5,6,7-tetrahydro-3-methyl-4-oxo-2-phenylindole hydrochloride (Ex. 4.3) | 2.4±0.5 | | | | >200 |
| 1-(2-dimethylaminoethyl)-4,5,6,7-tetrahydro-5-(p-methoxyphenyl)-4-oxo-2-phenylindole hydrochloride (Ex. 5.1) | 1.9±0.6 | | | | 200 |
| 1-(2-dimethylaminoethyl)-4,5,6,7-tetrahydro-2,6-diphenylindole hydrochloride (Ex. 7.1) | 2.0±0.5 | 3.3±0.5 | 61±17 | 9.9±1.8 | 200 |
| 1-(2-dimethylaminoethyl)-4,5,6,7-tetrahydro-3-methyl-2,6-diphenylindole hydrochloride (Ex. 8.1) | 5.4±1.5 | 4.7±1.0 | | | >300 |
| 4,5,6,7-tetrahydro-4-oxo-2,6-diphenyl-1-(2-piperidinoethyl)-indole hydrochloride (Ex. 6.1) | 15.3±3.5 | | | | 200 |
| 4,5,6,7-tetrahydro-4-oxo-2,6-diphenyl-1-(2-piperidinomethyl)-indole hydrochloride hemihydrate (Ex. 2.1) | 11±2 | | | | 300 |
| 1-(1-ethyl-3-piperidyl)-4,5,6,7-tetrahydro-4-oxo-2,6-diphenylindole (Ex. 1.5) | 14±3 | | | | 200 |
| 1-(2-dimethylaminoethyl)-4,5,6,7-tetrahydro-4-oxo-2,3,6-triphenylindole (Ex. 4.5) | 7.0±1.6 | 13±4 | | | >300 |
| 4,5,6,7-tetrahydro-1-(2-hydroxyethylaminoethyl)-4-oxo-2,6-diphenylindole hydrochloride (Ex. 1.4) | 6.2±1.5 | | | | >300 |
| Aspirin | 94 | 50 | | | |
| Codeine phosphate | 8.9 | 7.1 | 60 | 105 | |

In the phenylquinone writhing test (R. Banziger, in Pharmacologic Technics in Drug Evaluation, J. H. Nodine and P.

E. Siegler, Eds, Year Book Med. Pub., Chicago 1964), syndrome of intermittent abdominal contractions and hind limb extension is produced in mice following the intraperitoneal injection of phenylquinone. Premedication with various clinically effective analgesic drugs prevents the writhing syndrome.

When test compound was administered to 20 CFI mice (20 and 40 mg./kg.) 30 minutes before the phenylquinone injection, the dose at which 50 percent of the animals showed no writhes over the ensuing 30-minute period was calculated by the logprobit method of J. T. Litchfield and F. Wilcoxon, J. Pharmacol. Exp. Therap., 96:99, 1949. Under comparable experimental conditions, the blocking at the writhing syndrome in 50 percent of the animals by aspirin and codeine phosphate was measured.

In the mouse hotplate test, a test animal is placed on a hotplate heated to a standard temperature and the time required for the mouse to indicate discomfort is recorded, the discomfort being manifested by the mouse picking up a paw and licking same. The degree of analgetic effect caused by a test compound previously administered to the mouse is directly related to the time of reaction to discomfort demonstrated by the test animal. The test described is recognized as a standard method of determining the analgetic properties of a test compound.

The foregoing description and the following examples are exemplary of the scope and procedures of this invention. Other obvious equivalents to the structures detailed herein will be apparent to one skilled in the art and are, accordingly, included in this invention. Weights and measurements are stated in Metric System values. Temperatures herein are set forth in degrees Centigrade.

EXAMPLE 1

1-(2-dimethylaminoethyl)-4,5,6,7-tetrahydro-4-oxo-2,6-diphenylindole

5-Phenyl-1,3-cyclohexanedione 75.2 g. (0.4 mole) and 45 ml. of 50 percent aqueous KOH solution were dissolved in a mixture of 450 ml. methanol and 50 ml. water 31 g. phenacyl chloride was added with stirring which was continued for 5 hours. After standing at room temperature for 4 days the solution was evaporated to dryness in vacuo, the residue treated with aqueous sodium hydroxide solution which dissolved part of the material. The insoluble material was removed by filtration and the solution was acidified. 2-Phenacyl-5-phenyl-1,3-cyclohexanedione precipitated and was purified by crystallization from ethanol m.p. 112°–116°.

2-Phenacyl-5-phenyl-1,3-cyclohexanedione 15.3 g. (0.05 mole) and 10 ml. N,N-dimethylethylenediamine were refluxed for 20 hours in 200 ml. benzene, the water formed being removed by a Dean-Stark trap. The solution was evaporated to dryness taken up in 100 ml. acetic acid, diluted with 300 ml. water and made alkaline with excess ammonia water. An oily precipitate formed which solidified on standing. Crystallization from cyclohexane gave the pure title compound m.p. 125°–126° (1.1).

When in accordance with the above procedure, but in place of N,N-dimethylethylenediamine, there is utilized,
utilized, N,N-dimethylaminopropylamine
N-Methyl-ethylenediamine
2-(2-aminoethylamino)-ethanol
3-amino-N-ethylpiperidine
1-aminohexamethyleneimine
2-picolylamine
4-picolylamine
2-pyridylamine
3-pyridylamine
3-picolylamine
There is produced
1-(3-dimethylaminopropyl)-4,5,6,7-tetrahydro-4-oxo-2,6-diphenylindole—m.p. 108°–111° (1.2)
4,5,6,7-tetrahydro-1-(2-methylaminoethyl)-4-oxo-2,6-diphenylindole—m.p. 121°–123° (1.3)
4,5,6,7-tetrahydro-1-(2-hydroxyethylaminoethyl)-4-oxo-2,6diphenylindole hydrochloride—m.p. 223°–226° (1.4)
1-(1-ethyl-3-piperidyl)4,5,6,7-tetrahydro-4-oxo-2,6-diphenylindole—m.p. 150°–155° (1.5)
1(1-hexamethylenimino)-4,5,6,7-tetrahydro-4-oxo-2,6-diphenylindole—m.p. 291°–292° (1.6)
4,5,6,7-tetrahydro-4-oxo-2,6-diphenyl-1-(2-pyridylmethyl)indole—m.p. 184°–188° (1.7)
4,5,6,7-tetrahydro-4-oxo-2,6-diphenyl-1-(4-pyridylmethyl)indole—m.p. 187°–188° (1.8)
4,5,6,7-tetrahydro-4-oxo-2,6-diphenyl-1-(2-pyridyl)indole—m.p. 219°–220° (1.9)
4,5,6,7-tetrahydro-4-oxo-2,6-diphenyl-1-(3-pyridyl)indole—m.p. 253°–254° (1.10)
4,5,6,7-tetrahydro-4-oxo-2,6-diphenyl-1-(3-pyridylmethyl)indole—m.p. 181°–183° (1.11), respectively.

EXAMPLE 2

4,5,6,7-TETRAHYDRO-4-OXO-2,6-DIPHENYL-1-(2-PIPERIDYLMETHYL)-INDOLE HYDROCHLORIDE HEMIHYDRATE (2.1)

4,5,6,7-Tetrahydro-4-oxo-2,6-diphenyl-1-(2-pyridylmethyl) indole 6 g. was dissolved in 150 ml. acetic acid, 1 g. PtO$_2$ added and the mixture hydrogenated in a Parr apparatus at 60° and 50 pounds/sq. inch pressure for 6 hours. The catalyst was removed by filtration, the solution evaporated to dryness in vacuo, the residue taken up in ether, gaseous HCl passed through the ether solution and the hydrochloride salt which had formed filtered, washed with ether, dried and crystallized from isopropanol. The compound crystallizes as the hemihydrate which loses its water at 165° and melts at 208°.

When in accordance with the above procedure, but in place of 4,5,6,7-tetrahydro-4-oxo-2,6-diphenyl-1-(2-pyridylmethyl)indole, there is used:
4,5,6,7-tetrahydro-4-oxo-2,6-diphenyl-1-(3-pyridylmethyl)indole 4,5,6,7-tetrahydro-4-oxo-2,6-diphenyl-1-(3-pyridyl)indole
4,5,6,7-tetrahydro-4-oxo-2,6-diphenyl-1-(2-pyridyl)indole
4,5,6,7-tetrahydro-4-oxo-2,6-diphenyl-1-(4-pyridylmethyl)indole
there is obtained: the corresponding
4,5,6,7-tetrahydro-4-oxo-2,6-diphenyl-1-(3-piperidylmethyl)indole (2.2)
4,5,6,7-tetrahydro-4-oxo-2,6-diphenyl-1-(3-piperidyl)indole (2.3)
4,5,6,7-tetrahydro-4-oxo-2,6-diphenyl-1-(2-piperidyl)indole (2.4)
4,5,6,7-tetrahydro-4-oxo-2,6-diphenyl-1-(4-piperidylmethyl)indole (2.5)

EXAMPLE 3

2-(4-CHLOROPHENYL)-1-(2-DIMETHYLAMINOETHYL)-4,5,6,7-TETRAHYDRO 4-OXO-6-PHENYLINDOLE

In accordance with the general procedure of example 1 5-phenyl-1,3-cyclohexanedione and p-chlorophenacyl bromide are reacted to give 2-(p-chlorophenacyl)-5-phenyl-1,3-cyclohexanedione, m.p. 176°–179°. Further reaction with N,N-dimethylethylenediamine gives the title compound, crystallized from heptane, m.p. 128°–129°. (3.1).

EXAMPLE 4

1-(2-DIMETHYLAMINOETHYL)-4,5,6,7-TETRAHYDRO-3-METHYL-4-OXO-2,6-DIPHENYLINDOLE

5-Phenyl-1,3-cyclohexanedione 18.8 g. (0.1 mole) and 16.3 g. 1-oximino-1phenylacetone (0.1 mole) are dissolved in two 1. acetic acid with warming to 60°, 50 ml. water added and 30 g. zinc dust added with stirring. The temperature rises spontaneously to 95° and the reaction is finished by refluxing the mixture for 30 minutes after which it is poured on ice, the solid collected on a filter, washed with water, dried and crystallized from acetic acid. 4,5,6,7-Tetrahydro-3-methyl-4- oxo-2,6-diphenylindole m.p. 277°–279° is obtained. 12 g. of this is suspended in 500 ml. anhydrous dioxane, 1.56 g. potassium is added and the mixture is heated and stirred in a nitrogen atmosphere. The compound goes gradually into solution and the potassium derivative precipitates. Dimethylaminoethyl chloride (0.15 mole) in toluene solution is added dropwise, the mixture refluxed for 3 hours evaporated to dryness in vacuo and the residue treated with dilute hydrochloric acid. Insoluble starting material is filtered off, the solution made alkaline with excess ammonia, the precipitated amine collected on a filter, washed with water, dried and crystallized from heptane to yield the title compound m.p. 110°–112°. (4.1)

In accordance with the above procedure 3-ethyl-4,5,6,7-tetrahydro-4-oxo-2,6-diphenylindole is prepared from 5-phenyl-1,3-cyclohexanedione and 1-oximino-1-phenylbutan-2-one: (crystallized from butyl cellosolve m.p. 281°–282°). The potassium derivative is reacted with dimethylamineothyl chloride to give 1-(2-dimethyl-aminoethyl)-4,5,6,7-tetrahydro-3-ethyl-4-oxo-2,6-diphenylindole hydrochloride m.p. 112°–113° (4.2) (from heptane).

In accordance with the above procedure 6-(4-Chlorophenyl)-4,5,6,7-tetrahydro-3-methyl-4-oxo-2-phenylindole (m.p. 294°–295°, from Butyl Cellosolve), prepared from 5-(4-chlorophenyl)-1,3-cyclohexanedione and 1-oximino-1-phenylacetone, is reacted in the form of its potassium derivative with dimethylaminoethyl chloride, to yield 6-(4-chlorophenyl)-1-(2-dimethylaminoethyl)-4,5,6,7-tetrahydro-3-methyl-4-oxo-2-phenylindole hydrochloride m.p. 282°–284° (4.3) (from isopropanol).

In accordance with the above procedure 4,5,6,7-tetrahydro-6-(4-methoxyphenyl)-3-methyl-4-oxo-2-phenylindole (m.p. 277°–278°, from acetic acid), prepared from 5-(4-methoxyphenyl)-1,3-cyclohexanedione and 1-oximino-1-phenylacetone, is reacted in the usual manner with dimethylaminoethyl chloride to yield 1-(2-dimethylaminoethyl)-4,5,6,7-tetrahydro-6-(4-methoxyphenyl)-3-methyl-4-oxo-2-phenylindole hydrochloride. The free base crystallized from benzene melts 134°–141°, the hydrochloride crystallized from isopropanol melts 246°–247°. (4.4)

In accordance with the above procedure reduction of a mixture of 5-phenyl-1,3-cyclohexanedione and benzil monoxime in acetic acid with zinc dust gives 4,5,6,7-tetrahydro-4-oxo-2,3,6-triphenylindole, (crystals from cellosolve solvent) m.p. 333°–335°. Reaction of the potassium derivative with dimethylaminoethyl chloride gives 1-(2-dimethylaminoethyl)-4,5,6,7-tetrahydro-4-oxo-2,3,6-triphenylindole m.p. 154°–156° (4.5) (from isopropanol).

Reaction of the potassium derivative with 2-(1-pyrrolidinyl) ethyl chloride gives 4,5,6,7-tetrahydro-4-oxo-2,3,6-triphenyl-1-[2-(1-pyrrolidinyl)ethyl]indole m.p. 160° (4.6) (from isopropanol).

In accordance with the above procedure reduction of a mixture of 5-phenyl-1,3-cyclohexanedione and 1-oximino-1-phenyl-2-pentanone with zinc dust in acetic acid gives 4,5,6,7-tetrahydro-4-oxo-2,6-diphenyl-3-propylindole, m.p. 245°–246° (from cellosolve).

The potassium derivative with dimethylaminoethyl chloride gives 1-(2-dimethylaminoethyl)-4,5,6.7-tetrahydro-4-oxo-2,6-diphenyl-3-propylindole m.p. 112°–114° (4.7) (from heptane).

In accordance with the above procedure 4,5,6,7-tetrahydro-3-methyl-4-oxo-2-phenyl-6-styrylindole (m.p. 290°–291°, from ethyl acetoacetate) is prepared by reduction of a mixture of 5-styryl-1,3-cyclohexanedione and 1-oximino-1-phenylacetone in acetic acid with zinc dust.

Reaction of the potassium derivative with dimethylaminoethyl chloride gives 1-(2-dimethylaminoethyl)-4,5,6,7-tetrahydro-3-methyl-4-oxo-2-phenyl-6-styrylindole m.p. 112°–114° (4.8) (from heptane).

In accordance with the above procedure 3-benzyl-4,5,6,7-tetrahydro-4-oxo-2,6-diphenylindole m.p. 257°–259° (from cellosolve) is prepared by reduction of a mixture of 5-phenyl-1,3-cyclohexanedione and oximino-dibenzyl ketone with zinc in acetic acid.

Reaction of the potassium derivative with dimethylaminoethyl chloride gives 3-benzyl-1-(2-dimethylaminoethyl)-4,5,6,7-tetrahydro-4-oxo-2,6-diphenylindole m.p. 103°–104° (4.9) (from cyclohexane).

EXAMPLE 5

1-(2-DIMETHYLAMINOETHYL)-4,5,6,7-TETRAHYDRO-6-(4-METHOXYPHENYL)-4-OXO-2-PHENYLINDOLE HYDROCHLORIDE 4,5,6,7-Tetrahydro-6-(4-methoxyphenyl)-4-oxo-2-phenylindole (m.p. 265°–267°, from acetic acid) is prepared by heating 5-(4-methoxyphenyl)-2-phenacyl-1,3-cyclohexanedione and ammonia in methanol under pressure to 140° (according to example 1). Further reaction of the potassium derivative in accordance with the general procedure of example 4 with dimethylaminoethyl chloride gives the 1-(2-dimethylaminoethyl)-4,5,6,7-tetrahydro-6-(4-methoxyphenyl)-4-oxo-2-phenylindole hydrochloride m.p. 244°–246°(5.1) (from isopropanol-ether).

EXAMPLE 6

4,5,6,7-TETRAHYDRO-4-OXO-2,6-DIPHENYL-1-(2-PIPERIDINOETHYL)INDOLE HYDROCHLORIDE

2-Phenacyl-5-phenyl-1,3-cyclohexanedione 14 g. is heated in a pressure vessel with 120 ml. of 11 percent ammonia in methanol to 100° for 4 hours followed by 3 days heating at 140°. The solid which formed is crystallized from Cellosolve giving 4,5,6,7-tetradydro-4-oxo-2,6-diphenylindole m.p. 289°–290.5°. The potassium derivative prepared according to example 4 is reacted with piperidinoethyl chloride giving 4,5,6,7-tetrahydro-4-oxo-2,6-diphenyl-1-(2-piperidinoethyl)indole m.p. 239°–242°(6.1) (from isopropanol).

EXAMPLE 7

1-(2-DIMETHYLAMINOETHYL)-4,5,6,7-TETRAHYDRO-2,6-DIPHENYLINDOLE HYDROCHLORIDE 4,5,6,7-Tetrahydro-4-oxo-2,6-diphenylindole 20 g. is placed into the thimble of a Soxleth extraction apparatus and extracted by refluxing into a suspension of 30 g. lithium aluminum hydride in 600 ml. tetrahydrofuran. The excess LiAlH$_4$ is destroyed by adding ethyl acetate followed by water. The solution is extracted with ether, the ether solution dried with anhydrous MgSO$_4$ evaporated and the residue crystallized from cyclohexane with addition of charcoal. There is obtained 4,5,6,7-tetrahydro-2,6-diphenylindole m.p. 85°–90. The potassium derivative was reacted with dimethylaminoethyl chloride according to example 4 to give 1-(2-dimethylaminoethyl)-4,5,6,7-tetrahydro-2,6-diphenylindole hydrochloride m.p. 214°–217° (7.1) (from isopropanol).

EXAMPLE 8

1-(2-DIMETHYLAMINOETHYL)-4,5,6,7-TETRAHYDRO-3-METHYL-2,6-DIPHENYLINDOLE HYDROCHLORIDE

A solution of 15 g. 1-(2-dimethylaminoethyl)- 4,5,6,7-tetrahydro-3-methyl-4-oxo-2,6-diphenylindole (0.04 mole) in 200 ml. tetrahydrofuran is added dropwise with stirring to 80 ml. of diborane in tetrahydrofuran (0.8 mole) at 0° in a nitrogen atmosphere. Stirring is continued for 90 minutes at room temperature, 150 ml. of 5N hydrochloric acid is added and the tetrahydrofuran distilled off at atmospheric pressure. The solution is made alkaline with sodium hydroxide solution, extracted with ether, the ether solution dried with anhydrous MgSO$_4$ and gaseous HCl bubbled through to form 1-(2-dimethylaminoethyl)-4,5,6,7-tetrahydro-3-methyl-2,6-diphenylindole hydrochloride m.p. 224°–227° (8.1) (from isopropanol).

In accordance with the above procedure, but starting with:
1-(2-dimethylaminoethyl)-3-ethyl-4,5,6,7-tetrahydro-4-oxo-2,6-diphenylindole
1-(2-dimethylaminoethyl)-4,5,6,7-tetrahydro-4-oxo-2,6-diphenyl-3-propylindole
4,5,6,7-tetrahydro-4-oxo-2,6-diphenyl-1-(3-pyridyl)indole
there is obtained:
1-(2-dimethylaminoethyl)-3-ethyl-4,5,6,7-tetrahydro-2,6-diphenylindole hydrochloride m.p. 206°–208° (8.2)
1-(2-dimethylaminoethyl)-4,5,6,7-tetrahydro-2,6-diphenyl-3-propylindole hydrochloride m.p. 211°–216°(8.3) (from cellosolve).
4,5,6,7-tetrahydro-2,6-diphenyl-1-(3-pyridyl)indole indole m.p. 165°–167° (8.4) (from isopropanol), respectively.

EXAMPLE 9

In accordance with the procedure of example 2, 4,5,6,7-tetrahydro-2,6-diphenyl-1-(3-pyridyl)indole is hydrogenated to give 4,5,6,7-tetrahydro-2,6-diphenyl-1-(3-piperidyl)indole (9.1).

The active compounds of this invention may be administered in tablets or capsules in doses of 1–100 mg., in syrup at 0.5–20 mg./ml. concentration, in 1–50 mg. suppositories or by parenteral injection in 0.5–50 mg./ml. concentration. The following examples are illustrative.

EXAMPLE 10

| Ingredients | mg./Tablet |
| --- | --- |
| 1-(2-dimethylaminoethyl)-4,5,6,7-tetrahydro-3-methyl-4-oxo-2,6-diphenylindole hydrochloride | 10 |
| lactose USP (spray dried) | 170 |
| starch USP | 10 |
| magnesium stearate USP | 1 |
| flavor | q.s. |

All above ingredients are passed through a 60-mesh sieve, blended for 30 minutes and compressed directly into tablets on a suitable tablet press at a weight of 191 mg., using an eleven thirty-seconds inch biconcave scored punch.

EXAMPLE 11

| Ingredients | mg./Suppository |
| --- | --- |
| 1-(2-dimethylaminoethyl)4,5,6,7-tetrahydro-3-methyl-2,6-diphenylindole hydrochloride | 100 |
| cocoa butter | q.s. |

The drug and coca butter are combined, mixed thoroughly and formed into 2-gram suppositories.

EXAMPLE 12

| Ingredients | mg./Capsule |
| --- | --- |
| 6-(4-chlorophenyl)-1-(2-dimethylamino-ethyl)-4,5,6,7-tetrahydro-3-methyl-4-oxo-2-phenylindole hydrochloride | 20 |
| lactose USP | 100 |
| magnesium stearate | 1 |
| amorphous silicon dioxide (Cab-O-sil) | 5 |

These ingredients are combined, blended and passed through a No. 1 screen of Fitzpatrick comminutor machine before encapsulating into a two-piece hard gelatin No. 3 capsule on a standard capsulating machine at a net weight of 126 mg.

EXAMPLE 13

| Ingredients | mg./Suppository |
| --- | --- |
| 1-(2-dimethylaminoethyl)4,5,6,7-tetrahydro-3-methyl-2,6-dipenylindole hydrochloride | 100 |
| cocoa butter | q.s. |

The above ingredients are combined in sterile solution for parenteral use.

EXAMPLE 14

| Ingredients | Grams/Liter |
| --- | --- |
| 4,5,6,7-tetrahydro-1-2-methylamino-ethyl)-4-oxo-2,6-diphenylindole hydrochloride | 10 |
| granulated sugar | 600 |
| flavor | q.s. |
| color | q.s. |
| sodium benzoate | 1 |
| deionized water | q.s. |

All the above ingredients are dissolved in water, combined and made up to a volume of 1 liter.

We claim:
1. A compound compound selected from the group consisting group bases of formula A and salts thereof with pharmaceutically acceptable acids

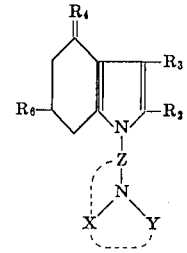

wherein:
$R_3$ is selected from the group consisting of hydrogen, lower alkyl, phenyl, and phenyl-lower alkyl.
$R_2$ and $R_6$ are selected the group consisting of phenyl, halophenyl and alkoxyphenyl.
Z is a straight or branched chain hydrocarbon moiety of zero to four carbon atoms,
$R_4$ is oxo;
X and Y designate hydrogen, lower alkyl, hydroxy-lower alkyl, phenyl-lower alkyl, or when taken together

form a heterocyclic ring of not more than eight members selected from the group: piperidino, 1-piperidino, and hexamethylenimino and wherein the term "lower alkyl" refers to both straight and branched chain radicals of one to six carbon atoms;
the group

when connected forms a heterocyclic ring moiety selected from the group: piperidyl and (lower alkyl) piperidyl, and wherein the term "lower alkyl" refers to both straight and branched chain radicals of one to six carbon atoms.

2. 4,5,6,7-Tetrahydro-1-(dimethylaminoethyl)-4-oxo-2,6-diphenylindole, a compound of claim 1.

3. 4,5,6,7-Tetrahydro-3-methyl-1-(dimethylamino-ethyl)-4-oxo-2,6-diphenylindole, a compound of claim 1.

4. 1-(2-Dimethylaminoethyl)-3-ethyl-4,5,6,7-tetrahydro-4-oxo-2,6-diphenylindole, a compound of claim 1.

5. 1-(2-Dimethylaminoethyl)-4,5,6,7-tetrahydro-2,6-diphenyl-4-oxo-3-propylindole, a compound of claim 1.

6. 4,5,6,7-Tetrahydro-1-(2-methylaminoethyl)-4-oxo-2,6-diphenylindole, a compound of claim 1.

7. 4,5,6,7-Tetrahydro-4-oxo-2,6-diphenyl-1-(2-piperidylmethyl)indole hydrochloride hemihydrate, a compound of claim 1.

8. 2-(4-Chlorophenyl)-1-(2-dimethylaminoethyl)-4,5,6,7-tetrahydro-4-oxo-6-phenylindole, a compound of claim 1.

9. 1-(2-Dimethylaminoethyl)-4,5,6,7-tetrahydro-6-(4-methoxyphenyl)-3-methyl-4-oxo-2-phenylindole hydrochloride, a compound of claim 1.

10. 2-Benzyl-1-(2-dimethylaminoethyl)-4,5,6,7-tetrahydro-3-methyl-4-oxo-6-phenylindole hydrochloride, a compound of claim 1.

11. 1-(2-Dimethylaminoethyl)-4,5,6,7-tetrahydro-4-oxo-2,3,6-triphenylindole, a compound of claim 1.

* * * * *

UNITED STATES PATENT OFFICE
CERTIFICATE OF CORRECTION

Patent No. 3,621,027                    Dated November 16, 1971

Inventor(s) Karl Schoen et al

It is certified that error appears in the above-identified patent and that said Letters Patent are hereby corrected as shown below:

Descriptor [54], title page and Column 1, line 2, for
"...-4-OXINDALES" read --...-4-OXOINDOLES--. Column 2, Formulas III and IV, for

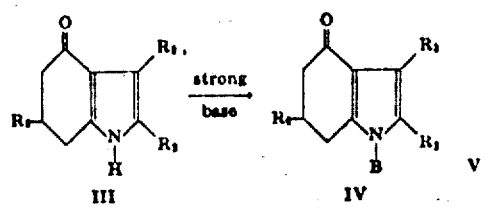

read

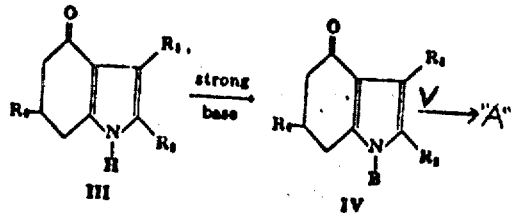

Column 3, line 7, for "hexoxphenyl" read --hexoxyphenyl--;
line 20, for "hexoxyphenyl heteroaryl" read --hexoxyphenyl; heteroaryl--; line 56, for "piperazinyl carbamoyloxy-lower alkylpiperazinyl hex-" read --piperazinyl, carbamoyloxy-lower alkyl piperazinyl, hex- --; line 59, for "straight branched chain" read --straight and branched chain--; line 75, for "(lower alkoxy)thiomorpholinyl piperazi-" read --(lower alkoxy)

UNITED STATES PATENT OFFICE
CERTIFICATE OF CORRECTION

Patent No. 3,621,027           Dated November 16, 1971

Inventor(s) Karl Schoen et al                    PAGE - 2

It is certified that error appears in the above-identified patent and that said Letters Patent are hereby corrected as shown below:

thiomorpholinyl, piperazi- --. Column 4, line 3, for "methory..." read --methoxy--; line 14, for "7 atoms" read --7 g-atoms--; line 40, for "Y-N-Z-Q"

read $$--Y-N-Z-Q--$$ with X above N.

Column 5, line 35 for "Z-N-X or X-N-Y" read --Z-N-X or X-N-Y--. Column 6, line 5 for "product is precipitated" read --product precipitated--. Columns 5 and 6, Table I, 1st line under the title "Compound" for "1-dimethylaminoethyl" read --1-(2-dimethylaminoethyl--; 7th line under title for "...tetrahydro-5-(p-methoxy..." read --...tetrahydro-6-(p-methoxy...--; 12th line under title for "...(2-piperidinomethyl)-indole" read --(2-piperidylmethyl)indole--; 14th line under title for "...piperidyl)j4,5,6,7..." read --...piperidyl)-4,5,6,7...--. Column 7, lines 36 and 37, for "1-(2-dimethylaminoethyl)-4,5,6,7-tetrahydro-4-oxo-2,6-diphenylindole" read -- 1-(2-DIMETHYLAMINOETHYL)-4,5,6,7-TETRAHYDRO-4-OXO-2,6-DIPHENYLINDOLE --; line 40, insert a comma after "water"; line 60, delete "utilized"; line 61, for "N-Methylethylenediamine" read -- N-methylethylenediamine --. Column 8, line 1, for "2,6di..." read --2,6-di...--; line 2, for "...piperidyl)4,5..." read --...piperidyl)-4,5...--; line 4, for "1(1-hexa..." read --1-(1-hexa...--; line 42, delete "the corresponding"; line 50, after "...(2.5)" insert --, respectively.--; line 55, for "...TETRAHYDRO 4-" read --...TETRAHYDRO-4- --; line 69, for "...1phenylacetone" read --...1-phenylacetone--. Column 9, line 22, for "6-(4-Chlorophen-" read ORM PO-1050 (10-69)                    USCOMM-DC 60376-P69
                                       ⋆ U.S. GOVERNMENT PRINTING OFFICE : 1969 O—366-334.

UNITED STATES PATENT OFFICE
CERTIFICATE OF CORRECTION

Patent No. 3,621,027                               Dated November 16, 1971

Inventor(s) Karl Schoen et al                              PAGE - 3

It is certified that error appears in the above-identified patent and that said Letters Patent are hereby corrected as shown below:

--6-(4-chlorophen- --.  Column 11, line 14, delete "indole" (second occurrence); lines 52-56, for "1-(2-dimethylaminoethyl)
        4,5,6,7-tetrahydro-3-methyl-2,6-
        diphenylindole hydrochloride

100 cocoa butter q.s."

read --

1-(2-dimethylaminoethyl)
        4,5,6,7-tetrahydro-3-methyl-2,6-
        diphenylindole hydrochloride        100 cocoa butter        q.s. --;

Column 12, for tabulation in Example 13 read:

UNITED STATES PATENT OFFICE
CERTIFICATE OF CORRECTION

Patent No. 3,621,027  Dated November 16, 1971

Inventor(s) Karl Schoen et al  PAGE - 4

It is certified that error appears in the above-identified patent and that said Letters Patent are hereby corrected as shown below:

| Ingredients | Mg/Ml |
| --- | --- |
| 4,5,6,7-tetrahydro-1-(2-hydroxyethyl-aminoethyl)-4-oxo-2,6-diphenylindole hydrochloride | 5 |
| sodium chloride | q.s. for isotonicity |
| methylparaben USP | 1.8 |
| propylparaben USP | 0.2 |
| water | q.s. --; | line 36, for "ing group bases" read --ing of bases--; line 65, for "1-piperidino," read --1-pyrrolidinyl,--. Column 13, line 2, for "1-(dimethylaminoethyl)" read --1-(2-dimethylaminoethyl)--; line 4 for "1-(dimethylamino-ethyl)" read --1-(2-dimethyl-aminoethyl)--.

Signed and sealed this 25th day of December 1973.

(SEAL)
Attest:

EDWARD M. FLETCHER, JR.  RENE D. TEGTMEYER
Attesting Officer  Acting Commissioner of Patents